US012673330B2

(12) United States Patent
Hänninen

(10) Patent No.: US 12,673,330 B2
(45) Date of Patent: Jul. 7, 2026

(54) APPARATUS AND METHOD FOR GRINDING LUMPY MATERIAL

(71) Applicant: MOVIATOR OY, Vaajakoski (FI)

(72) Inventor: Pertti Hänninen, Vaajakoski (FI)

(73) Assignee: MOVIATOR OY, Vaajakoski (FI)

( * ) Notice: Subject to any disclaimer, the term of this patent is extended or adjusted under 35 U.S.C. 154(b) by 214 days.

(21) Appl. No.: 18/549,815

(22) PCT Filed: Mar. 3, 2022

(86) PCT No.: PCT/FI2022/050136
§ 371 (c)(1),
(2) Date: Sep. 8, 2023

(87) PCT Pub. No.: WO2022/189698
PCT Pub. Date: Sep. 15, 2022

(65) Prior Publication Data

US 2024/0149271 A1 May 9, 2024

(30) Foreign Application Priority Data

Mar. 9, 2021 (FI) ...................................... 20210015
Dec. 15, 2021 (FI) ...................................... 20216280

(51) Int. Cl.
*B02C 15/00* (2006.01)

(52) U.S. Cl.
CPC ...... *B02C 15/007* (2013.01); *B02C 2015/008* (2013.01)

(58) Field of Classification Search
CPC ................ B02C 15/004; B02C 15/007; B02C 2015/008; B02C 15/006; B02C 15/00
See application file for complete search history.

(56) References Cited

U.S. PATENT DOCUMENTS 2,998,935 A * 9/1961 Pellizzetti ............... B02C 15/14 241/126
3,790,095 A * 2/1974 Gillette ................. B02C 15/007 241/117

(Continued)

FOREIGN PATENT DOCUMENTS

CN 105080665 11/2015
CN 105080665 A * 11/2015

(Continued)

OTHER PUBLICATIONS

Translation of CN-111921633.*

(Continued)

*Primary Examiner* — Bobby Yeonjin Kim
(74) *Attorney, Agent, or Firm* — Ziegler IP Law Group, LLC.

(57) ABSTRACT

The object of the invention is an apparatus and a method for grinding lumpy material. The solution according to the invention comprises a grinding plate (2) rotating on the horizontal plane around a vertical axis of rotation, onto the top surface of which the material (3) to be ground can be fed, and on the top surface (8) of which grinding plate is a plurality of grinding discs (4*a*), which rotate by the effect of the rotating motion of the grinding plate (2) and compress the material to be ground against the grinding plate (2). The apparatus comprises a revolver mechanism for changing the angle of the plane of rotation (RP) of the grinding discs (4*a*) with respect to a line in the direction of the radius of the grinding plate (2).

14 Claims, 2 Drawing Sheets

(56) References Cited

Figure 1:
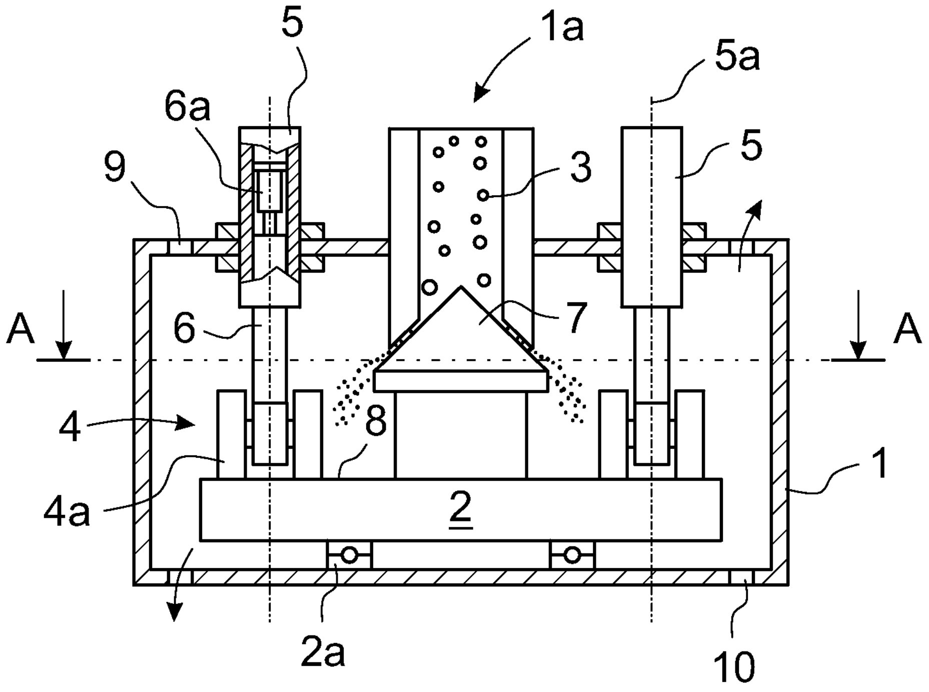

U.S. PATENT DOCUMENTS 3,951,347 A 4/1976 Tiggesbaumker et al.
4,072,276 A * 2/1978 Romanowski ........ B02C 15/007
241/117

FOREIGN PATENT DOCUMENTS

CN 111921633 B * 12/2021 ........... B02C 15/004
WO WO-2009115210 A1 * 9/2009 ........... B02C 15/006

OTHER PUBLICATIONS

Translation of CN-105080665.*
Translation of WO-2009115210.*
The International Search Report (ISR) with Written Opinion for PCT/FI2022/050136 dated May 12, 2022, pp. 1-10.

* cited by examiner

APPARATUS AND METHOD FOR GRINDING LUMPY MATERIAL

CROSS REFERENCE TO RELATED APPLICATIONS

The present application is a U.S. national phase of International Application No. PCT/FI2022/050136, filed Mar. 3, 2022, which claims priority to Finland Patent Application No. 20216280, filed Dec. 15, 2021 and Finland Patent No. 20210015, filed Mar. 9, 2021, all of which are incorporated herein by reference in their entirety.

The object of the present invention is an apparatus as presented in the preamble of claim 1 and a method as presented in the preamble of claim 9 for grinding lumpy material.

The apparatus and method according to the invention, hereinafter more concisely solution, is well suited e.g. for grinding the slag produced in conjunction with crushed steel slag or other metal manufacturing.

One apparatus implementing the solution according to the invention is a plane grinder comprising an essentially planar grinding plate rotating on the horizontal plane, onto the top surface of which the material to be ground can be fed, and wherein on the top surface of the grinding plate is a plurality of grinding discs, which rotate from the effect of the rotating motion of the grinding plate and press the material to be ground against the top surface of the grinding plate by means of the compression forces of compression means acting on the grinding discs.

Grinder devices known per se in the art, or more concisely mills, applicable to grinding steel slag are disclosed e.g. in Finnish utility model no. FI12742 and Finnish patent no. FI128329. Tests and use of the mills have demonstrated that the crushed material is of exactly the right quality for what is desired for the mill. These mills, however, do not have a grinding plate rotating around a vertical axis on the horizontal plane according to the present invention nor grinding discs rotating on its surface.

One grinder device provided with grinding discs or rolls rotating along with a grinding plate rotating on the horizontal plane is disclosed in Chinese patent specification no. CN106861824 A. The grinder device comprises a grinding plate rotating on the horizontal plane, on the outer edge of which is a separate inclined grinder groove, in which the individual grinding discs are disposed to rotate from the force of the rotating motion of the grinding plate. Each grinding disc is on its own rotating shaft, which is in an oblique attitude, i.e. at an angle with respect to the horizontal plane of the top surface of the grinding plate. In addition, a hydraulic cylinder is fastened to the shaft of each angled grinding disc, with which cylinder the pressing of the grinding disc on the grinding plate and the angle of the shaft with respect to the horizontal plane can be adjusted. The structure of the CN specification differs substantially from the structure according to the invention, in which the rotating shaft of the grinding discs can revolve around the plane of rotation that is on the vertical plane of the grinding disc, i.e. can thus simultaneously revolve the plane of rotation of the grinding discs around a vertical axis of rotation. This cannot be done in the solution according to the CN specification.

The plane of rotation in this context refers to the plane that is perpendicular in relation to the axis of rotation of the grinding disc and that runs in the direction of the plane of the sides of the grinding disc via the center point of the grinding disc. In practice, this type of plane passes through the center point of the width of the grinding disc. The plane of rotation can also be referred to as the rotation plane. When the rotating shaft of a grinding disc is on the horizontal plane, the plane of rotation of the grinding disc is on the vertical plane.

Also US patent specification no. U.S. Pat. No. 3,951,347 discloses a grinder device for crushing hard to pulverize material. According to the patent specification, the device comprises a customary rotatable grinding plate and a plurality of rotatable grinding discs or rolls in a groove on the surface of the plate. Each disc package has two grinding discs and they are connected to each other with a common horizontal shaft, as in the solution according to the invention. However, there is no mention in the patent specification that the grinding discs would revolve around their plane of rotation, nor are such structures visible in the drawings of the patent specification.

With the solutions according to prior art it is not possible to achieve an end result of sufficient quality for all purposes. For example, with the solutions according to prior art ground steel slag can not necessarily be successfully used as a substitute for cement in the manufacture of concrete.

The aim of the present invention is to eliminate the aforementioned drawbacks and to provide a simple and inexpensive grinder device e.g. for bringing steel slag to such a grinding fineness and quality that it can be used, inter alia, as a substitute for cement. Additionally, an aim of the invention is to further develop a plane grinder and to improve is efficacy and desired result. The apparatus according to the invention is characterized by what is disclosed in the characterization part of claim 1. Correspondingly, the method according to the invention is characterized by what is disclosed in the characterization part of claim 9. Other embodiments of the invention are characterized by what is disclosed in the other claims.

For realizing the aim of the invention, the plane grinder according to the invention comprises a grinding plate rotating on the horizontal plane around a vertical axis of rotation, onto the top surface of which the material to be ground can be fed, and on the top surface of which grinding plate is a plurality of grinding discs, which rotate as a consequence of the rotating motion of the grinding plate and compress the material to be ground against the grinding plate. Preferably the plane grinder comprises a revolver mechanism for changing the angle of the plane of rotation of the grinding discs with respect to a line in the direction of the radius of the grinding plate.

The plane grinder according to the invention comprises a grinding plate rotatable around a vertical axis of rotation on the horizontal plane, onto the top surface of which the material to be ground is fed, and on the top surface of which grinding plate the material to be ground is rotated, by means of the rotating motion of the grinding plate, against the compressing grinding discs. Preferably the angle of the plane of rotation of the grinding discs is changed with respect to a line in the direction of the radius of the grinding plate. Preferably in this case the plane of rotation of the grinding discs is revolved around the vertical axis of rotation.

One great advantage of the solution according to the invention is a simple, operationally reliable an inexpensive grinder device e.g. for grinding steel slag and for improving the quality of the grinding result. With the solution according to the invention the properties of ground steel slag can be improved and brought to such a fineness and quality that it can be used, inter alia, as a substitute for cement.

The apparatus according to the invention, preferably a plane grinder, is intended for grinding residual slag produced from a steel mill, in which case residual lime separated from the steel residue is obtained. The residual lime can be ground with the plane grinder according to the invention to be so dust-like that the lime is suited to the steel industry as a substitute for cement powder. The residual slag is subjected to grinding treatment between the top surface of the grinding plate and the grinding discs, in which case heat that assists the grinding is also produced.

If the ground lime is not ground to be sufficiently fine it is conducted back into the grinding cycle again until the grain size of the residual lime is between 10-50 μm, which is suitable for the cement industry as a substitute for cement.

Figure 2:
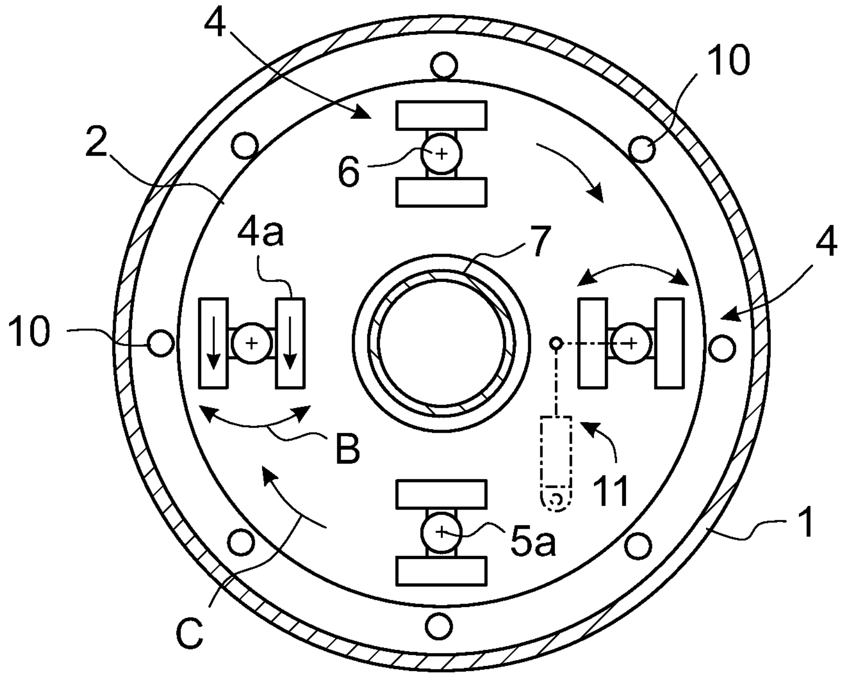
Figure 3:
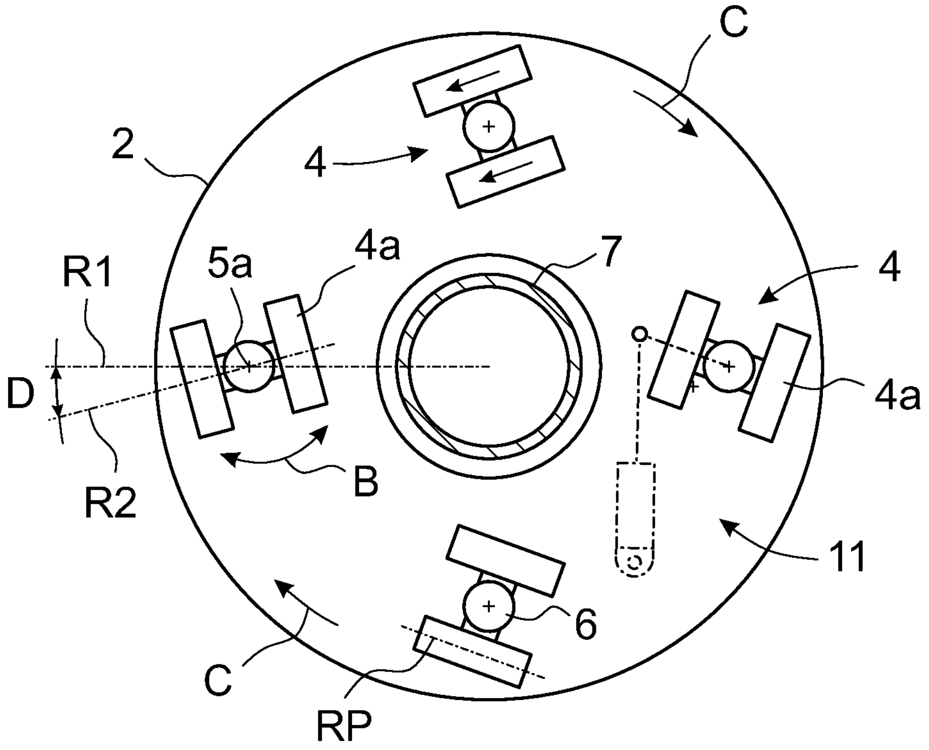
Figure 4:
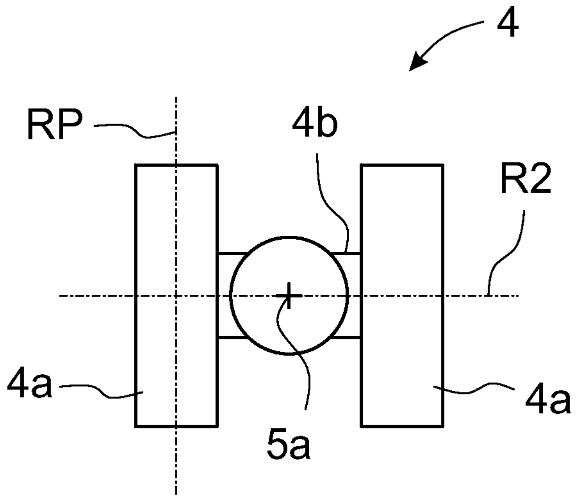

In the following, the invention will be described in more detail by the aid of some preferred embodiments with reference to the simplified and diagrammatic drawings attached, wherein FIG. 1 presents a simplified and partially sectioned side view of the apparatus, e.g. a plane grinder, according to the invention, FIG. 2 presents a simplified top view of the apparatus according to FIG. 1 sectioned along the line A-A of FIG. 1 and also the grinding discs in their first rotational position, FIG. 3 presents a simplified top view of the apparatus according to FIG. 1, sectioned along the line A-A of FIG. 1 and also removed from the frame part of the apparatus, and the grinding discs in their second rotational position, and FIG. 4 presents a magnified top view of a grinding disc pair used in the invention, sectioned along line A-A of FIG. 1.

FIGS. 1 and 2 present a simplified and partially cross-sectioned plane grinder to be used in the solution according to the invention. The plane grinder in FIG. 1 is presented as viewed from the side, and in FIG. 2 as viewed from the top and sectioned along the line A-A of FIG. 1, as well as the grinding disc units 4 in their first rotational position.

The apparatus, i.e. preferably plane grinder, according to the invention comprises and enclosure-type frame part 1 and inside it an essentially planar grinding plate 2 mounted on one or more support bearings 2*a* and rotating on the horizontal plane around its vertical axis of rotation in the direction of the arrow C, onto the top surface 3 of which the material 3 to be ground can be fed via the input aperture 1*a*. The material to be ground is e.g. steel slag crushed into lumpy material and containing residual lime.

On the top surface 8 of the grinding plate 2 is a plurality of grinding disc units 4 with their grinding discs 4*a*, which rotate essentially around their horizontal axis of rotation by the effect of the rotating motion of the grinding plate 2. Each grinding disc unit 4 is fitted by means of its vertical drive shaft 6 to its own support means 5, preferably to a hollow vertical shaft, which is fixed immovably to the cover of the frame part 1. Each drive shaft 6 is fastened at its bottom end to its grinding disc unit 4.

In addition, the apparatus comprises a pressing mechanism 6*a* for each grinding disc unit 4. The pressing mechanism 6*a* can preferably be inside a hollow, tubular support means 5 and arranged to press the grinding discs 4*a* against the grinding plate 2. The pressing mechanism 6*a* can comprise e.g. one or more power means, such as a hydraulic cylinder, which is adapted to press the vertical drive shaft 6 in the vertical direction towards the grinding plate 2. The grinding discs 4*a* press the material 3 to be ground against the grinding plate 2 from the effect of the compressive forces acting on the grinding discs 4*a*.

By revolving the drive shaft 6 around its vertical center axis, the grinding disc unit 4 simultaneously revolves around its vertical center axis, i.e. around its vertical axis of rotation 5*a*. Preferably the vertical center axis of the support means 5, the vertical center axis of the drive shaft 6, and the vertical axis of rotation 5*a* of the grinding disc unit 4 are all on the same straight vertical line. When the grinding disc unit 4 revolves around its vertical axis of rotation 5*a*, the plane of rotation of each grinding disc 4*a* simultaneously pivots. This function can also be called revolving of the plane of rotation around the axis of rotation 5*a*.

In this case the friction between the top surface 8 of the grinding plate 1 and the grinding discs 4*a* increases and a grinding friction force is produced in the material to be ground between the grinding discs 4*a* and the surface 8 of the grinding plate 2, which force improves the grinding result. Preferably the compressive force of the pressing mechanism 6*a* acts on the grinding disc unit 4 and grinding discs 4*a* via the drive shaft 6.

The revolving of the drive shafts 6 around their center axes, e.g. in the manner presented by the arrow B in either rotation direction whatsoever, is realized with the revolver mechanism 11 of the solution, which preferably comprises e.g. a pressure cylinder and an articulation mechanism suited to the purpose. The revolver mechanism 11, which is presented in conjunction with only one grinding disc unit 4 and diagrammatically with a dot-and-dash line in FIGS. 2 and 3, can be disposed e.g. on the cover of the frame part 1 or in some other suitable location on the frame part 1. The revolver mechanism 11 can be e.g. inside the frame part 1 fastened to the roof or side wall of the frame part.

The material 3 to be ground is fed via the input aperture 1*a* into the plane grinder, preferably to the center of the grinding plate 2. The material 3 drops from the input aperture 1*a* onto the conical grinder 7 at the center point of the grinding plate 2, where it is pre-ground, after which the material to be ground drops onto the top surface 8 of the grinding plate 1. Preferably the conical grinder 7 comprises a cone narrowing upwards rotating along with the grinding plate 2 and a non-rotating counter-cone opening downwards, between which cones is a narrow gap through which the material to be ground is able to drop onto the top surface R of the grinding plate 1.

The material ground between the grinding plate 2 and the grinding discs 4*a* forms fine dust-like lime, which is very light and which is easy to remove via the apertures 9 in the top cover of the frame part 1 of the grinder, either with an air extractor or by means of positive pressure inside the frame part 1 of the grinder, into a suitable collection container for further processing. The coarser material, which contains ground steel slag containing particles of steel and larger particles of lime, is conducted via holes in the bottom part, e.g. in the base, of the frame part 1 of the grinder to a conveyor below, from where the material is again conducted into the input aperture 1*a* of the grinder for regrinding.

FIG. 3 presents a simplified top view of a plane grinder according to FIG. 1, sectioned along the line A-A of FIG. 1 and also removed from the frame part 1 of the plane grinder, and the grinding discs 4*a* in another rotational position.

In the situation presented by FIG. 3 each grinding disc unit 4 is revolved around its vertical axis of rotation 5*a* with its own drive shaft 6 to the extent of the desired angle of rotation D. In this case the axis of rotation R2 of the grinding discs 4*a* of the grinding disc unit 4 is at an angle D with respect to the line R1 in a direction of the radius of the grinding plate 2 at the point of the grinding disc unit 4. In such a case the aforementioned line R1 in a direction of the radius crosses the vertical axis of rotation 5*a* of each grinding disc unit 4, i.e. center axis, preferably at a right angle to it.

Correspondingly, the plane of rotation RP of each grinding disc 4*a*, e.g. the plane in the direction of the side of the disc, is at an angle of 90°-D with respect to a line R1 in the direction of the radius of the grinding plate 2 at the point of the axis of rotation 5*a* of the grinding disc unit 4.

The angle D can be any angle whatsoever and can be negative or positive with respect to the line R1 in the direction of the radius of the grinding plate 2. Furthermore, the angle D can be equal or also unequal always at the same time for each grinding disc unit 4, in which case the grinding result of each grinding disc unit 4 is different.

FIG. 4 presents a magnified top view of one grinding disc pair, i.e. a grinding disc unit 4 comprising two grinding discs 4*a*, used in the invention, sectioned along the line A-A of FIG. 1. This unit has two similar grinding discs 4*a*, which are connected to each other preferably with a horizontal shaft 4*b*, on the ends of which the discs 4*a* are mounted on bearings. The center axis of the horizontal shaft 4*b* is simultaneously the axis of rotation R2 of the grinding discs 4*a*, which axis is preferably horizontal. A dual-disc or a multidisc grinding disc unit 4 is fastened to its drive shaft 6, preferably symmetrically as viewed from above at the center point of the unit, via which the vertical axis of rotation 5*a* of the grinding disc unit 4 in this case passes. In such a case by revolving the drive shaft 6 around its vertical axis of rotation, the planes of rotation of all the grinder discs 4*a* of one grinder disc unit 4 revolve symmetrically by the extent of the angle of rotation D. In FIG. 4 the plane of rotation RP of only one grinding disc 4*a* is marked with a dot-and-dash line. Preferably the plane of rotation RP is vertical.

A dual-disc grinding disc unit 4 is fastened to its drive shaft 6 preferably at the center of the horizontal axis 4*b*. There can also be just one grinding disc 4*a* in a grinding disc unit, in which case the fastening of the disc to the drive shaft 6 can be done from just one side of the horizontal shaft 4*b* or from both sides of the disc. Preferably in this case the center axis of the drive shaft 6 is on the same line, as viewed from above, as the center point of the disc 4*a*, in which case the vertical axis of rotation 5*a* of the disc and the axis of rotation, i.e. center axis, of the drive shaft 6 coincide. The center axis of the drive shaft 6 in a single-disc grinding disc 4 can also be on a different vertical line to the axis of rotation 5*a* of the grinding disc 4*a*.

There can be more than two grinding discs 4*a* attached to the same horizontal shaft 4*b* on which the compressive force of the pressing mechanism 6*a* acts via the drive shaft 6.

The grinding disc unit 4 can also be the bogie-type wheel assembly of a train or airplane, comprising two or more horizontal shafts 4*b* and which is rotatable in the manner described by the arrow B around the vertical center axis, i.e. axis of rotation, of the drive shaft 6 fastened to the grinding disc unit 4. When the grinding disc unit 4 comprises a number of grinding discs 4*a*, the total surface area of the grinding disc unit 4 expands.

The shaft 4*b* of the grinding discs 4*a* can also be inclined into an angle with respect to the plane of the surface of the grinding plate 2 if the cross-sectional shape of the discs so requires or if there is a groove suited to this type of profile shape on the contact surface of the grinding plate 2 and grinding discs 4*a*. In such a case, however, the solution must enable revolving of the grinding disc unit 4 around its axis of rotation 5*a*.

The grinding disc unit 4 can be fastened to the drive shaft 6 in such a way that the unit receives an oscillating, wobbling sideways movement when the unit 4 is revolved in the manner indicated by the arrow B. The revolving motion can be for a unit 4 separately or a connected series. The pressing mechanism 6*a* can comprise one or more hydraulic cylinders or other power means, known per se in the art, producing a compressive force.

It is obvious to the person skilled in the art that the invention is not limited solely to the examples described above, but that it may be varied within the scope of the claims presented below. Thus, for example, the plane grinder apparatus can differ in its structural solution to what is presented above.

It is also obvious to the person skilled in the art that the suspension structure of the grinding disc units can be different to what is described above. In this case e.g. the pressing of the grinding discs against the surface of the grinding plate could have been realized with other solutions than with a power cylinder concurrent with the direction of the vertical axis of the support means. The grinding discs can be pressed against the surface of the grinding plate by some suitable power means e.g. from the side of the grinding disc unit.

It is also obvious to the person skilled in the art that the suspension of a grinding disc unit can be realized otherwise than with one drive shaft revolvable around its center axis. What is essential is that the structure of the plane grinder comprises means for turning the plane of rotation of the grinding discs to different angles with respect to the line between the position of the grinding discs and the center point of the grinding plate.

The invention claimed is:

1. An apparatus configured for grinding a material, wherein the apparatus comprises a grinding plate rotating around a vertical axis of rotation on a horizontal plane, wherein the material can be fed onto a top surface of the grinding plate, wherein on the top surface of the grinding plate is a plurality of grinding discs which are configured to rotate by effect of a rotating motion of the grinding plate and compress the material to be ground against the grinding plate, wherein the apparatus further comprises a plurality of grinding disc units, wherein each of the plurality of grinding disc units comprises one or more grinding discs of the plurality of grinding discs, wherein each of the grinding disc units is suspended on a vertical drive shaft and a horizontal shaft, wherein the vertical drive shaft is parallel with the vertical axis of rotation of the grinding plate, wherein the apparatus comprises a revolver mechanism configured for changing an angle of a plane of rotation of the grinding discs by turning the horizontal shaft and the grinding discs around the vertical axis of rotation of the grinding disc units in a horizontal direction with respect to a line in a direction of a radius of the grinding plate.

2. The apparatus according to claim 1, wherein the revolver mechanism is configured for revolving the vertical drive shaft around its vertical center axis for changing the angle of the plane of rotation of the grinding discs.

3. The apparatus according to claim 1, wherein each of the grinding disc units comprises an additional revolver mechanism driving the vertical drive shaft of each of the grinding disc units, independently or synchronously with other vertical drive shafts, for revolving the vertical drive shaft of each of the grinding disc units around its vertical center axis for changing the angle of the plane of rotation of each of the grinding discs.

4. The apparatus according to claim 1, wherein the apparatus comprises a plurality of pressing mechanisms configured for producing compressive force, the compressive force being arranged to press the grinding disc units towards the top surface of the grinding plate.

5. The apparatus according to claim 4, wherein the compressive force of the pressing mechanisms is arranged to press the grinding disc units towards the top surface of the grinding plate from the horizontal shaft of the grinding disc units via the vertical drive shaft.

6. The apparatus according to claim 1, wherein the plane of rotation of the grinding discs is vertical.

7. The apparatus according to claim 1, wherein the one or more grinding discs are mounted on bearings on the horizontal shaft.

8. A method of operating the apparatus of claim 1, the method comprising feeding the material onto the top surface of the grinding plate, rotating the grinding plate such that the material is compressed against the grinding discs, changing the angle of the plane of rotation of the grinding discs with respect to the line in the direction of the radius of the grinding plate with a revolver mechanism, and creating a grinding friction force between the grinding discs and the grinding plate.

9. The method according to claim 8, wherein the plane of rotation of the grinding discs is revolved around the vertical axis of rotation of the plurality of grinding units.

10. The method according to claim 8, wherein when revolving the plane of rotation of the grinding discs around the vertical axis of rotation, the plane of rotation is kept perpendicular to the horizontal plane of the top surface of the grinding plate.

11. The method according to claim 8, wherein the plane of rotation of the grinding discs is revolved by the vertical drive shaft of the grinding discs via the revolver mechanism connected to the vertical drive shaft.

12. The method according to claim 8, each wherein the vertical drive shaft is revolved around its vertical center axis independently or synchronously with other vertical drive shafts.

13. The method according to claim 8, wherein the grinding discs are pressed against the top surface of the grinding plate via pressing mechanisms producing compressive force.

14. The method according to claim 8, wherein a grinding friction force is exerted on the material to be ground between the grinding discs and the top surface of the grinding plate by revolving the plane of rotation of the grinding discs and/or by pressing the grinding discs against the top surface of the grinding plate.

* * * * *